May 9, 1933.  O. WESTERMANN  1,907,633
ELECTRICAL APPARATUS
Filed Feb. 18, 1932  2 Sheets-Sheet 1

WITNESSES:
Arthur J. McMahon
C. F. Bryant

INVENTOR
Otto Westermann
BY
Franklin E. Hardy
ATTORNEY

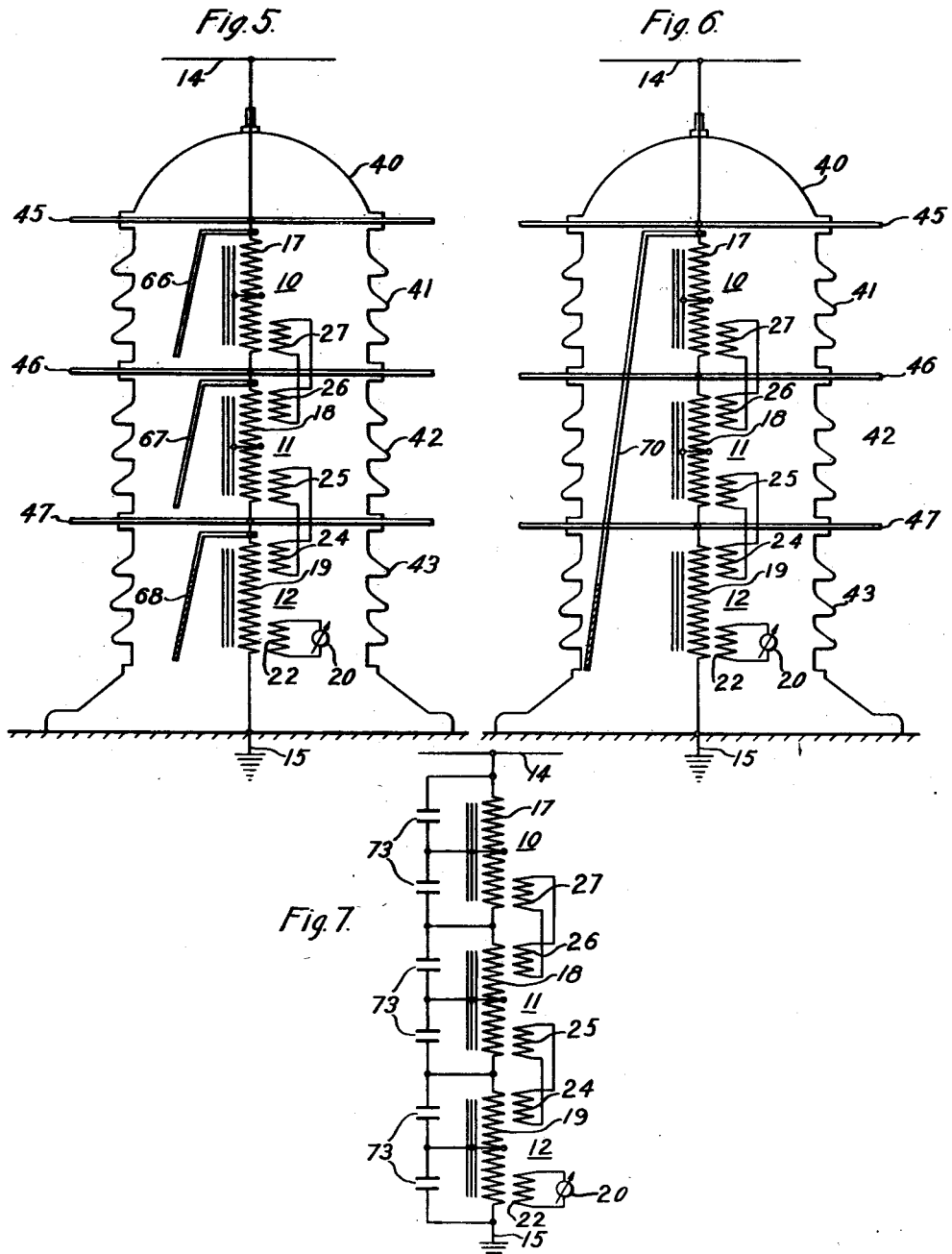

Patented May 9, 1933

1,907,633

UNITED STATES PATENT OFFICE

OTTO WESTERMANN, OF BERLIN-CHARLOTTENBURG, GERMANY, ASSIGNOR TO WESTINGHOUSE ELECTRIC & MANUFACTURING COMPANY, A CORPORATION OF PENNSYLVANIA

ELECTRICAL APPARATUS

Application filed February 18, 1932, Serial No. 593,722, and in Germany March 11, 1931.

My invention relates to protective systems for electrical apparatus and has particular relation to systems for protecting the windings of cascade-connected transformers, choke coils or similar apparatus from unequal insulation stress upon the occurrence of abnormal voltage surges in the circuit with which the windings are associated.

When applying transformers, reactors or choke coils to high-voltage electrical circuits, it is frequently of economic advantage to utilize a plurality of units connected in series or cascade instead of utilizing only a single unit. This results from the fact that such cascading permits of distinct savings in insulation since advantageous use can thereby be made of the fact that each individual unit so connected, need carry only that fraction of the total circuit voltage corresponding to the number of units in the connection.

For example, in a situation in which voltage transformers are connected in cascade between a high-tension-circuit conductor and the ground for measuring the circuit potential to ground, it is customary to utilize a plurality of approximately similar transformer units, the high-tension windings of which are connected in series, and the low-tension windings of one or more of which serve to energize a metering circuit. Although the insulation to ground must be increased as the high-tension conductor is approached, the insulation of the high-tension winding to the iron core in each transformer need be designed only for a fraction of the full voltage.

In a case in which three voltage transformers are so utilized in cascade and the iron core of each transformer is connected with the middle point of the high tension winding, it is evident that the maximum voltage which may occur between a point in the winding and the iron will be only ⅙ of the total voltage provided the voltage is evenly distributed throughout the winding, and insulation for this value only is required.

As is known, similar arrangements are also used for high-voltage testing transformers as well as for reactors and choke coils associated with high-tension circuits, and the insulation advantages, already pointed out for voltage transformers, likewise apply to such situations.

As has been indicated above, the cascade arrangement reduces the voltage across the individual units in the cascade when subjected to normal operating conditions. When, however, high frequency voltages or voltage surges appear across the cascade connected windings, as, for instance, upon the occurrence of switching surges, or travelling waves caused by lightning or other disturbances in the electrical circuit, increased insulation stresses will be set up in the individual cascade-connected units. These stresses result from an uneven distribution of voltage over the entire group of cascade-connected windings caused by the capacities of the windings of the individual units.

In the past, it has been necessary to strengthen the insulation at the end turns of the cascade connected windings in order to provide for these abnormal surge-voltage conditions. Such an expedient is subject to the disadvantage of being unduly expensive in that it requires more insulating material, and in addition, considerably complicates the manufacture and assembly of the electrical windings involved.

My invention is directed to an improved means for protecting cascade-connected windings from unequal distribution of voltage stresses upon the occurrence of surge voltages in the circuit.

It is accordingly, an object of my invention to provide a protective system of the type described which will serve to equally distribute the stresses throughout the several windings of a cascade-connection upon the occurrence of a voltage surge.

In practicing my invention, I make use of the principle that when the voltage is changing rapidly, as in case of a very high-frequency voltage, or a voltage surge, in a combination of apparatus of the type described, the voltage distribution is determined principally by the magnitude of the internal capacities of the individual electrical windings, that is, the capacities of the single turns of the windings to one another and the capacity to ground. According to my invention, capacitors are provided in association with the several windings connected in cascade, which capacitors are preferably of such size and are so arranged, that the potentials occurring during surge-like or high-frequency voltages will be distributed among the individual windings in approximately the same proportion as is the operating voltage during regular operation. The auxiliary capacitors may be of any suitable type, such as static condensers.

While it is already known that auxiliary capacitors may be used with single transformers and other similar devices for equalizing stresses in different parts of the same winding, this invention contemplates considerably more than this prior development in that it extends the use of auxiliary capacitors to cascade-connected electrical windings for the purpose of evenly distributing abnormal voltage surges along the individual windings in the cascade-connected combination. Since a uniform distribution of voltage among the individual winding units, may be readily obtained by this means, my invention makes it possible to more efficiently utilize the insulation advantages offered by the connection of transformers or reactors in cascade between different points in high-tension electrical circuits.

My invention, together with additional objects and advantages thereof, will best be understood from the following description of specific embodiments, when read with reference to the accompanying drawings, in which:

Fig. 5 illustrates a modification of the embodiment of my invention shown in Fig. 2 in which sheet-metal shields are provided for the individual transformers in addition to the paralleling capacitors.

Fig. 6 illustrates a modification of the embodiment of my invention shown in Fig. 5 in which the individual transformer shields are combined into a single shielding element; and Fig. 7 illustrates a further embodiment of my invention in which capacitors are arranged in parallel with fractional parts of the individual windings.

Figure 1:
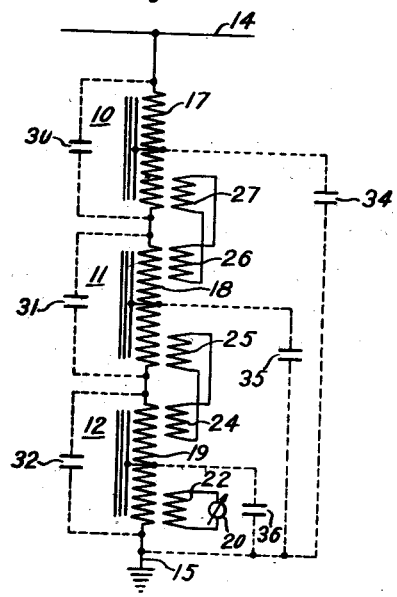
Figure 1 is a diagrammatic representation of a plurality of cascade-connected voltage transformers in which the winding capacities have been represented by conventional condenser symbols to assist in explaining the principles upon which my invention is based.

Referring to the drawings, and particularly to Fig. 1 thereof, three cascade-connected voltage transformers, shown generally at 10, 11, and 12, are illustrated as having high-tension windings 17, 18, and 19, respectively, connected in series between a conductor 14 of a high-voltage circuit and the ground 15. As illustrated in Fig. 1, the points of the high-tension windings are connected to the iron cores of the transformers, which cores are represented by the groups of vertically drawn parallel lines which appear at the left of the windings. The iron cores may also, as will be understood, be completely insulated from the windings.

A meter circuit, designated by a device 20, is shown as being energized from a secondary winding 22 of the transformer 12. The transformers illustrated are also provided with special coupling windings 24, 25, 26 and 27, which are interconnected in such a way that the power supplied to the metering circuit 20 is distributed approximately uniformly over the entire cascade.

The capacities of the parts of each of the windings toward one another are schematically indicated in Fig. 1 by capacitors 30, 31 and 32 which are intended to illustrate that the individual turns of the windings bear a capacitive relation to one another. Each of the windings also has an effective capacity to ground, which in Fig. 1 is indicated for the respective units by capacitors 34, 35 and 36.

To maintain the desired uniform voltage distribution upon the occurrence of abnormal voltage surges, it is essential that the capacities of the individual transformer windings be properly supplemented with auxiliary or external capacities. As has been indicated, these auxiliary capacities may consist of condenser or capacitor devices of any suitable type, one preferred manner of providing them being illustrated in Fig. 2.

Figure 2:
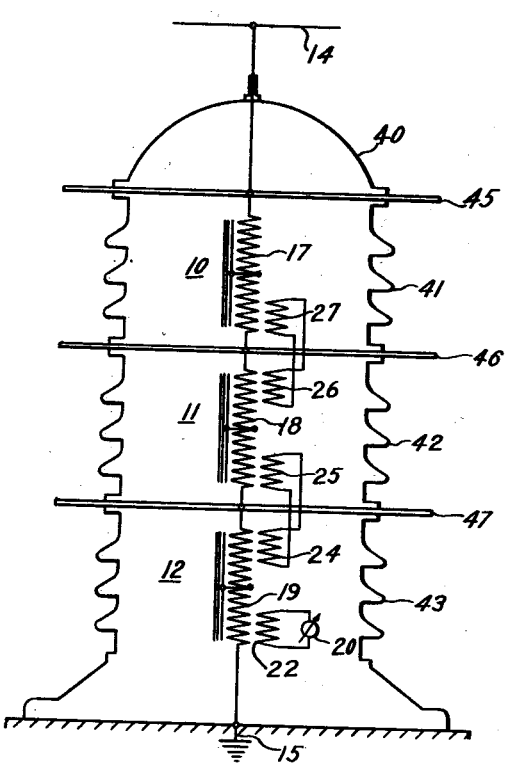
Fig. 2 is a diagrammatic view of apparatus and circuits illustrating one embodiment of my invention applied to the transformers shown in Fig. 1.

In Fig. 2 the cascade-connected transformers illustrated in Fig. 1, are shown as being surrounded by a built-up porcelain casing of well known type, which is illustrated as comprising the separate sections indicated at 40, 41, 42 and 43. Between the casing sections are disposed conducting or semi-conducting plates respectively indicated at 45, 46 and 47. The upper plate will be seen to be connected with the high-tension conductor 14, the middle plate with the conductor connecting the high-tension windings of transformers 11, and the lower plate with the conductor which joins the high-tension windings of transformer 12.

Plates 45, 46 and 47 thus form the metal sheets of capacitors which are connected in parallel with the individual transformer windings. For the particular combination shown, the capacity parallel to the winding 19 of transformer 12 is the capacity of plate 47 to the ground 15.

Through the use of the combination shown in Fig. 2 it is possible, when the capacitors are properly proportioned, to attain a distribution of high-frequency or surge voltage in the individual transformers which is almost exactly equal to the distribution of the operating voltage, so that abnormal stresses of transformer insulation tend to be uniformly distributed, thereby permitting, as before pointed out, the insulating material to be utilized to the best advantage.

The capacity of the condensers or capacitors required may readily be calculated from the internal capacity of the windings in well known manner. Such calculation shows that, considering specifically the arrangements depicted in Figs. 1 and 2 in which the cascade-connected transformers are disposed in series between a circuit conductor and ground rather than between two circuit conductors, neither of which is grounded, when an exactly uniform distribution of voltage is to be attained, the auxiliary capacity paralleling the transformer windings must increase in size as the ground connection is departed from, and the high-tension circuit conductor is approached.

It is, however, not always necessary to use different sized capacitors as in many cases a sufficiently uniform voltage distribution will be obtained when capacitors of the same size are used. This is particularly true when the magnitude of the individual winding capacities is great as compared with the capacity to ground of the windings.

In an assembly of the type shown in Fig. 2, the magnitude of the capacities formed by plates 45, 46 and 47, may be adjusted either by changing the size of the plates or their relative spacing distances. Thus, if a greater capacity is desired, the plates may be set closer together, or a material having a dielectric constant greater than that of air may be used to separate them. This latter combination is shown in Fig. 3.

Figure 3:
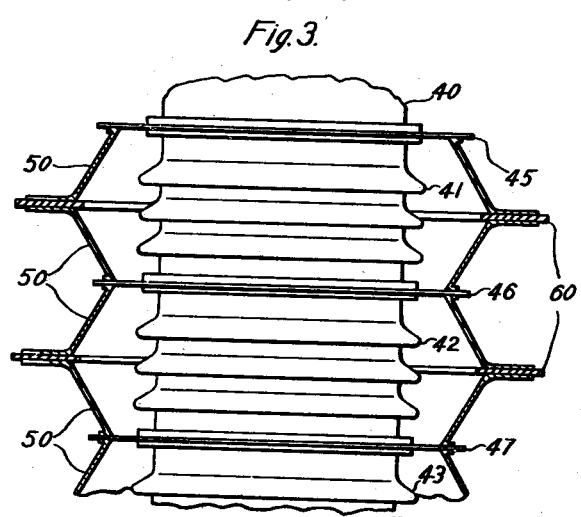
Fig. 3 illustrates a modification in the physical structure of the capacitor elements shown in Fig. 2.

In Fig. 3, which represents a portion of the porcelain casing shown in Fig. 2, the conducting material plates 45, 46 and 47 have attached thereto, outside of the main casing comprising sections 41, 42 and 43, sheet metal members 50 which are separated by special dielectric material washers 60 in order that the increased value of capacity may be attained.

Figure 4:
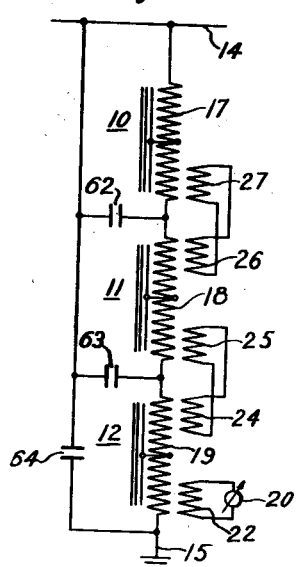
Fig. 4 shows a second embodiment of my invention applied to the transformers illustrated in Fig. 1.

If desired, other standard static condensers of more conventional types may also be used to supply these capacities. These condensers may be connected between the high-tension conductor 14 and the ends of the windings of the several transformers as shown in Fig. 4, instead of parallel to the windings as is shown and described in connection with Figs. 2 and 3. In Fig. 4, these static condensers are indicated at 62, 63 and 64.

The arrangements so far described serve, primarily, to distribute abnormal surge voltages equally among the several cascade-connected transformers. As a further refinement in the protective system, means may be provided whereby the voltage distribution in each of the several windings may be made more uniform. Such a combination is shown in Fig. 5 in which the protective scheme illustrated in Fig. 2 is supplemented by sheet metal shields of a well known type which are connected with one end of each of the high-tension windings of the transformers, and designated in Fig. 5 at 66, 67 and 68. Since the action of such sheet metal shields in distributing surge voltages in a single winding is well known, no further description of that action will here be included.

To further simplify the shielding arrangement illustrated in Fig. 5, the several individual shields may, in many instances, be combined into a single shield of the general type shown in Fig. 6. In Fig. 6 this shield, which is designated at 70, is connected with the high-tension conductor 14 and is so proportioned and spaced with respect to the windings and other apparatus that a high-frequency or surge voltage will be uniformly distributed along each of the windings as well as among the several transformer units.

It is also feasible to arrange the auxiliary capacitors to parallel separate portions of each of the several windings rather than the complete windings. Such an expedient will be seen to constitute a further refinement in that it permits of more accurate matching with the internal capacities of the windings. One form of this arrangement is shown in Fig. 7.

In Fig. 7 each half of each of the high-tension windings of all of the several cascade-connected transformers is illustrated as being paralleled by a capacitor, the conductors being shown at 73. This arrangement presents the advantage that the same condenser, when of suitable size, will distribute a surge over a single winding as well as over the entire cascade in the same way that the voltage is distributed in regular operation.

Instead of using special capacitors in this case, the desired capacities may be produced by properly designing the mutual capacity of the special parts of conducting or semi-conducting material that are connected to the winding.

While thus far the description has been particularly directed to arrangements of capacitors applied to voltage-transformers connected in cascade between a conductor of a high-tension circuit and the ground, it will be understood that the schemes of my invention shown may likewise be applied to other applications of electrical windings which include all cases where transformers are used in cascade, or electrical windings of any kind are connected in series for energization from an electrical circuit. It is thus suitable for reactors or choke coils that are connected in cascade and are used for compensating the ground current of a power-transmission line or circuit.

It will likewise be apparent that my invention may also be used for transformer or choke coils in casacde which are connected between two ungrounded conductors of a circuit rather than between one conductor and ground so that the several embodiments already described in connection with the latter combination are likewise suitable for application in cases in which the ground connection is replaced by a second conductor of the electrical circuit.

Although I have shown and described certain specific embodiments of my invention, I am fully aware that many further modifications thereof are possible. My invention, therefore, is not to be restricted except insofar as is necessitated by the prior art and by the spirit of the appended claims.

I claim as my invention:

1. In combination with a plurality of electrical windings connected in cascade between different points in an electrical circuit, an arrangement for protecting the insulation of said windings from unequal surge-voltage stresses comprising capacitators associated with the several windings in the cascade connection, said capacitators being so disposed that abnormal voltages arising during surge conditions in said circuit will tend to be distributed among the windings in the same way as is the normal operating voltage impressed upon them.

2. An insulation protective scheme for a plurality of cascade-connected electrical windings, comprising the combination of a static capacitator disposed to parallel each of said windings, said capacitators being of such size that a high-frequency or surve voltage impressed upon the windings will tend to be distributed among them in the same way as is their normal operating voltage.

3. An insulation protective scheme for a plurality of electrical windings connected in cascade between different points in an electrical circuit comprising the combination of a static capacitator connected between one of said circuit points and one end of each of said windings, said capacitators being of such size that a high-frequency or surge voltage impressed upon the windings will tend to be distributed amoun them in the same way as is their normal operating voltage.

4. An insulation protective scheme for a plurality of cascade-connected electrical windings comprising the combination of a static capacitator disposed to parallel a portion of each of said windings, said capacitators being of such size and so disposed that a high-frequency or surge voltage impressed upon the windings will tend to be distributed among them in the same way as is their normal operating voltage.

5. In an electrical winding structure, a plurality of coils connected in cascade, an insulating casing surrounding each coil, and capacitator elements connected to each coil and so dimensioned electrically as to cause a substantially even distribution of surge voltage throughout the winding.

6. In an electrical winding structure comprising a plurality of coil units, connected in series, an insulating casing surrounding each coil unit, and a capacitator element connected to each unit, the several capacitor elements being so dimensioned electrically as to cause a substantially even distribution of surge voltage throughout the winding.

7. In an electrical winding structure comprising a plurality of coil units connected in series, an insulating casing surrounding each coil, and a capacitor element connected to each coil for causing a substantially even distribution of surge voltage throughout the turns of said coil.

8. In an electrical winding structure comprising a stack of coil units connected in series, each unit comprising a coil, an insulating casing surrounding the coil, and a capacitor element connected to the high voltage end of said coil and extending outwardly between the insulating casings of adjacent units.

9. In an electrical winding structure, a plurality of units each comprising a core of magnetic material, a winding thereon, and an insulating casing surrounding the winding, said units being arranged to form a stack, the several windings being connected in series, a coupling winding circuit between adjacent units for equalizing the magnetic flux therein, and capacitors connected to the windings of the several units, said capacitors being so dimensioned electrically as to cause a substantially uniform distribution of surge voltage throughout the winding.

10. In an electrical winding structure, a plurality of units each comprising a core of magnetic material, a winding thereon, and an insulating casing surrounding the winding, said units being arranged to form a stack, the several windings being connected in series, capacitors connected to the several windings and extending outwardly beyond the insulating casing associated therewith, and electrostatic shields connected to the windings and positioned along the winding within the casing.

In testimony whereof, I have hereunto subscribed my name this 16th day of January, 1932.

OTTO WESTERMANN.